Nov. 25, 1941.                G. F. HILLEMAN                2,263,874
                              PLANT PROTECTOR
                            Filed Sept. 3, 1940
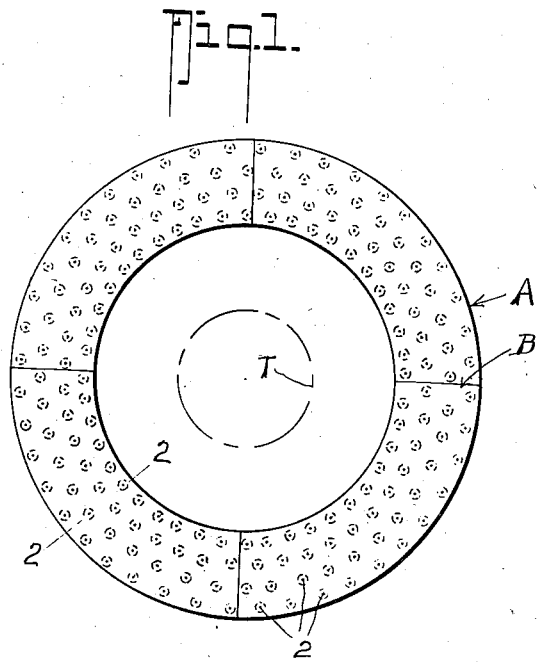
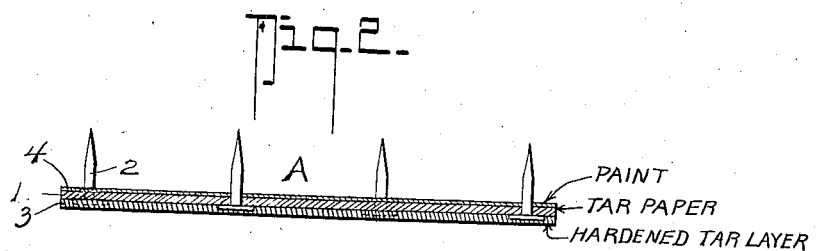
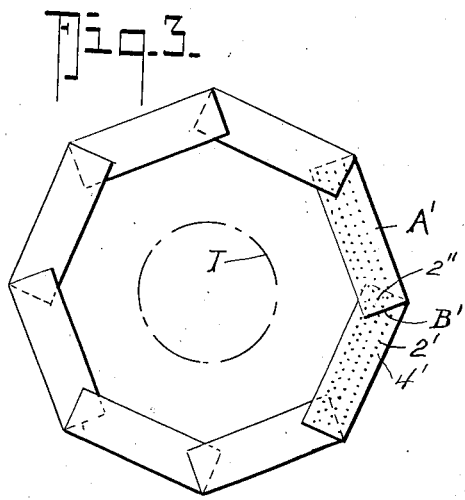
G. F. Hilleman, Inventor
By Albert E. Dieterich, Attorney Patented Nov. 25, 1941

2,263,874

UNITED STATES PATENT OFFICE 2,263,874

PLANT PROTECTOR

Gustav Frederick Hilleman, Miles City, Mont.

Application September 3, 1940, Serial No. 355,242

2 Claims. (Cl. 47—32)

My invention is a device designed to keep animals of all sorts, especially dogs, away from trees, flowers, shrubs, etc.

More specifically it is an object of the present invention to prevent dogs from micturating on flowers, shrubs, trees and other structures.

Generally, the device consists of a flat flexible plate, or plates, of suitable material (preferably tar paper) through which tacks have been driven, the tacks by virtue of their sharpness, preventing dogs or other animals from stepping on them.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which—

Fig. 1 is a plan view of a protector made of arcuate segments placed end to end in a circle about the plant.

Fig. 2 is a magnified section on the line 2—2 of Fig. 1.

Fig. 3 is a diagrammatic view of a modified form of the device.

In the drawing A, in Figs. 1 and 2, represents the plate which may be of any suitable size and shape, preferably arcuate as shown in Fig. 1 or rectangular as indicated by A' in Fig. 3. The plates may be placed end to end as at B in Fig. 1 or lapped as at B' in Fig. 3. When lapped tacks 2' in a lower plate may be caused to pierce the upper plate where they lap and thus secure the plates together as at 2" in Fig. 3.

The plates A or A' as the case may be are preferably made of tar paper 1 through which tacks 2 are driven. The underside of the paper 1 is then coated with a layer of hard tar 3 which not only protects the paper 1 from moisture from the ground, but also secures the tacks against coming out of the paper.

The top surface of the paper 1 is painted as at 4 to conform, in appearance, to the surface where the device is placed. For instance, if the device is to be used on lawns, the paint will be green so as to resemble grass.

When the device is placed around the plant or other object to be protected, it will keep all animals with tack pierceable feet away. The shape of the plate will of course vary with the area to be protected. In general the tack-covered area must or should so surround the object to be protected that it will not at any place give access to the object to be protected.

From the foregoing description taken with the accompanying drawing forming a part hereof, it is thought the construction and utility of the invention will be clear to those skilled in the art.

What I claim is:

1. A tree and plant protector to be laid on the ground around the tree or plant including a flexible plate of fibrous material through which tacks have been driven, the bottom face of the plate being coated with a layer of tar embedding the heads of the tacks.

2. A tree and plant protector to be laid on the ground around the tree or plant and comprising plates of flexible fibrous material through which tacks have been driven, the face of the plates adjacent the ground being coated with a layer of tar embedding the heads of the tacks.

GUSTAV FREDERICK HILLEMAN.